3,353,892
BINOCULAR STEREOSCOPIC MICROSCOPE HAVING SUBSTANTIALLY ACHROMATIC WEDGE PRISMS ADJACENT COMMON FRONT OBJECTIVE LENS

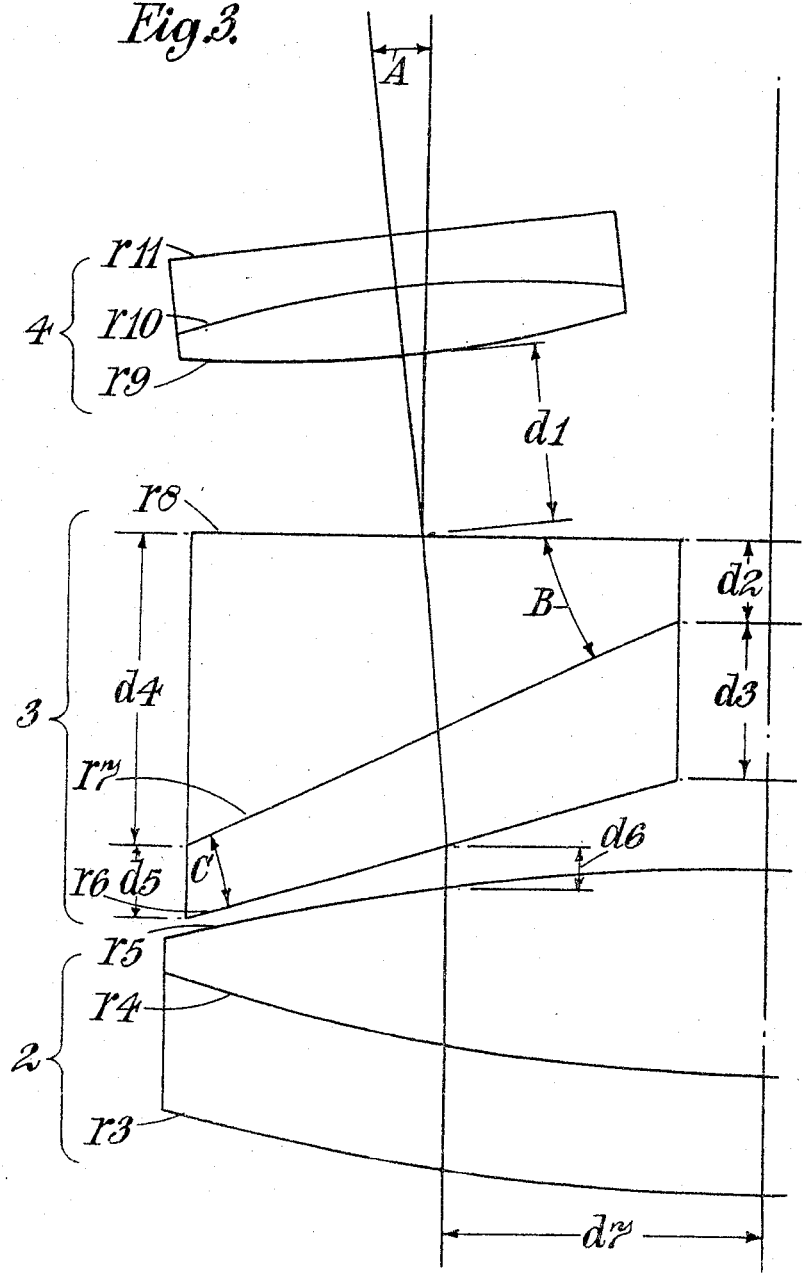

Thomas Alan Minns and Harold Horace Hopkins, Barnet, England, assignors to W. Watson & Sons Limited, Barnet, England, a British company
Filed Jan. 10, 1963, Ser. No. 250,592
Claims priority, application Great Britain, Jan. 12, 1962, 1,289/62
3 Claims. (Cl. 350—36)

The invention relates to microscopes.

The invention provides a binocular stereoscopic microscope comprising two optical systems for the two eyes respectively, a front lens which is associated with both of the said systems, the aforesaid systems being inclined to each other and to the optical axis of the front lens, and deviating means optically between the front lens and the two aforesaid systems to direct light from the front lens into the two systems.

Preferably the two optical systems are of continuously variable magnification. Preferably mechanical means are provided to vary the magnification of the two systems in unison, having a magnification varying control such that equal movements of the control vary the magnification by equal ratios. Preferably the two optical systems are variable over a range of greater than four to one.

Preferably the mutual inclination of the two optical systems is fixed and there is provided means optically after the two systems for adjusting the eyepiece separation to suit the interpupillary distance of an observer.

Preferably images of an object at a fixed distance in front of the front lens are formed at a fixed distance behind the fixed lens.

A specific embodiment of the invention will now be described by way of example and with reference to the accompanying drawings, in which:

FIGURE 3 shows on a larger scale part of the front lens, deviating prism and zoom components of the microscope.

Figure 1:
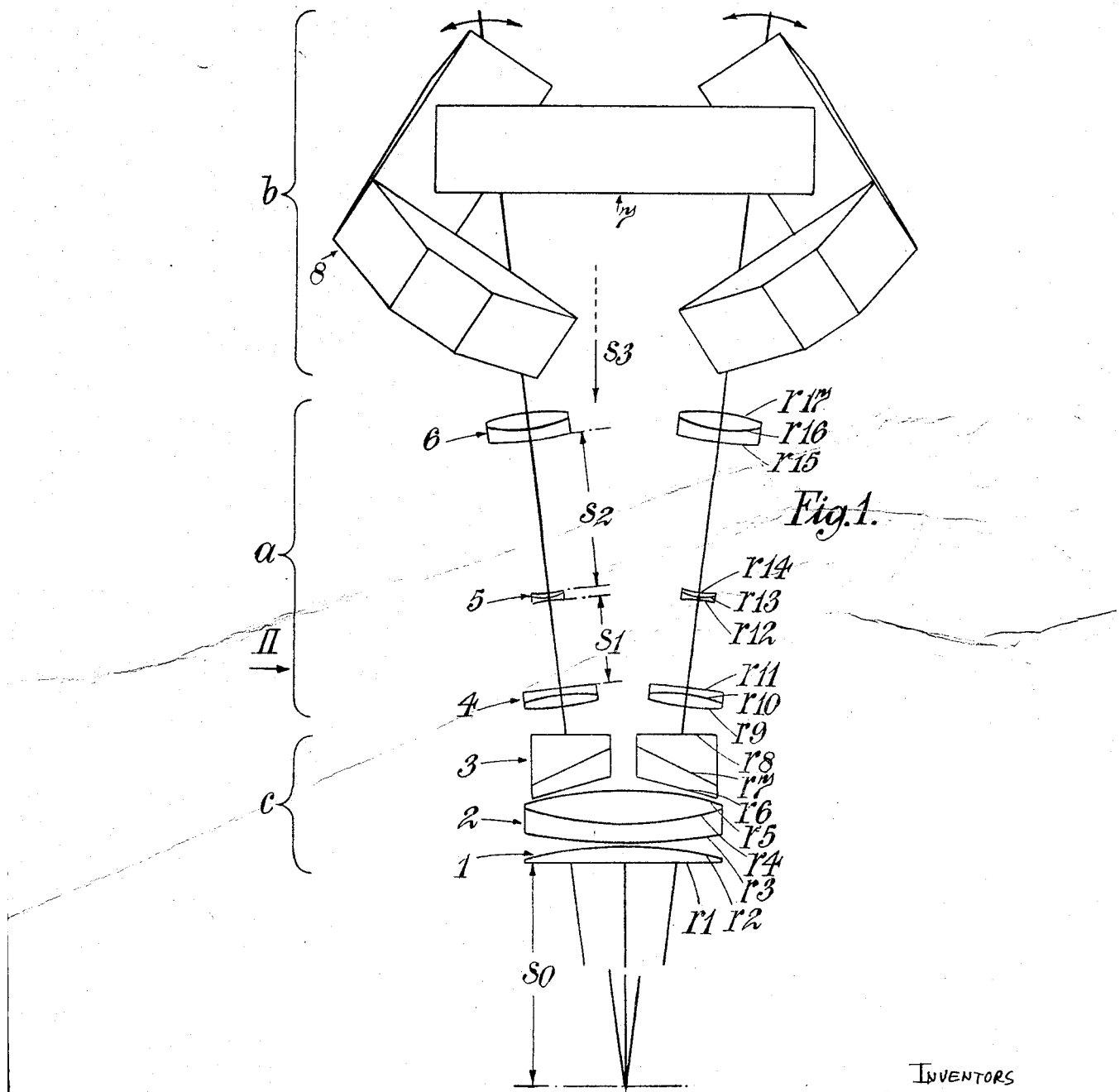
FIGURE 1 shows the optical components of a binocular stereoscopic zoom microscope.
Figure 2:
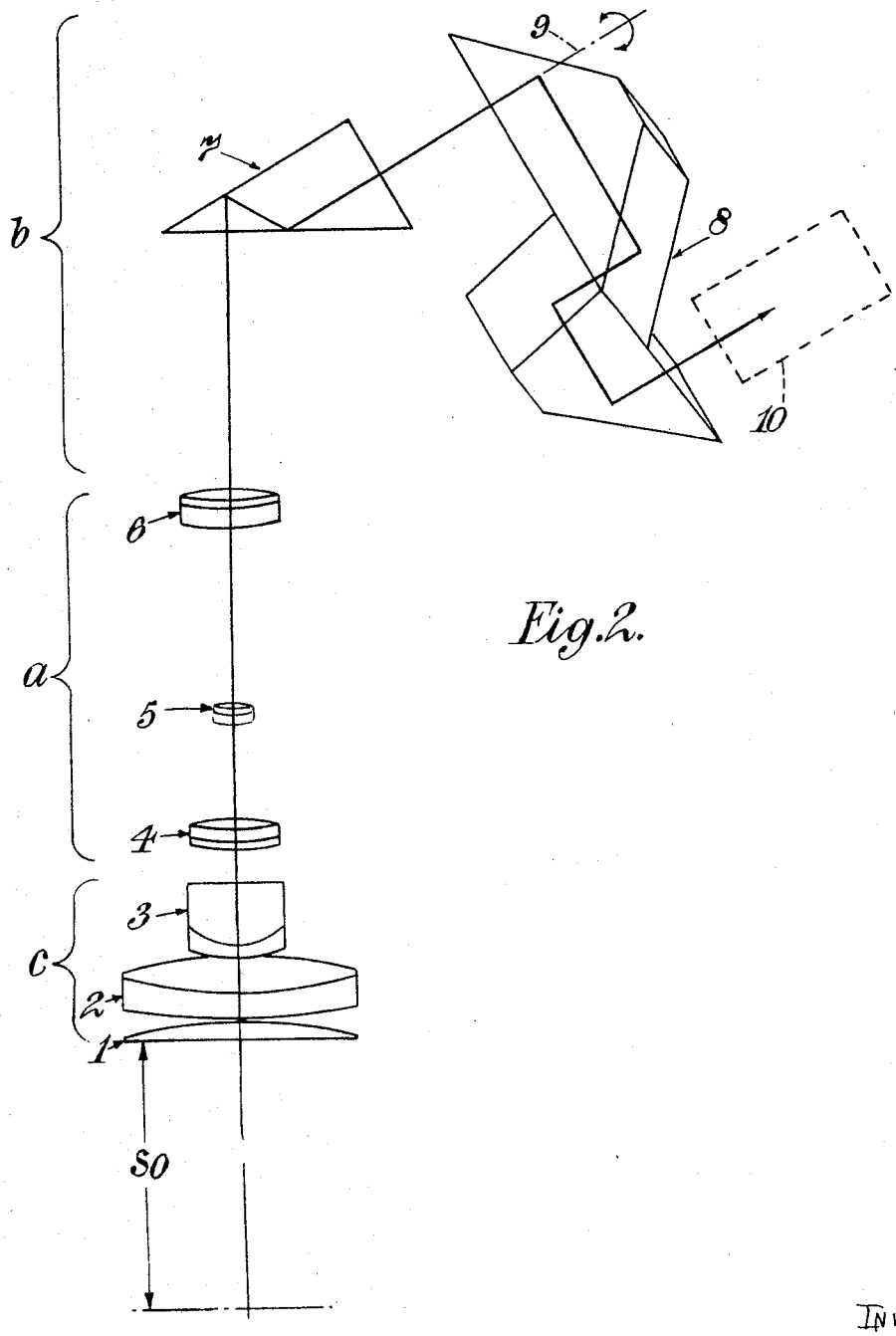
FIGURE 2 is a side view of the components, in the direction of the arrow II in FIGURE 1.

In this embodiment, the microscope comprises two optical systems *a* each of variable magnification and having their optical axes inclined to each other at an included angle of 14°; a front optical system *c* preceding the variable magnification systems and including both a front lens system 1 and 2 and deviating prisms 3, and a prism system *b* following the variable magnification systems to incline the plane of the two eyepieces towards the observer, to invert the images and to provide means for adjusting the eyepiece separation to suit the interpupillary distance of the observer.

The large front lens of the front optical system comprises a plano-convex element 1 followed by a cemented doublet 2. The equivalent focal length of this lens system is 100 mm., which permits a clear working distance of 93 mm., an angle between the viewing axes of 14° with a separation of 24.34 mm., between the parallel viewing axes on the image side of the front lens system. The chromatic aberration, spherical aberration and coma of the front lens system are made small and non-zero at the full aperture of the lens in such a way as to reduce to a minimum the total aberration integrated over that aperture of the lens system used by each of the following zoom lens systems, each of which is effectively centered on one of the two viewing axes.

Following the front lens system, on each viewing axis, is an achromatic deviating prism 3 constructed from the same types of optical glass employed in the large front lens and each providing a deviation equal to 7° in the minimum deviation position and each in a direction opposed to the deviation of the corresponding viewing axis which takes place at the large front lens.

Following the compound front lens plus prism system, the viewing axes, hereinafter conveniently referred to as the zoom axes, diverge at an angle of 14°. On each zoom axis, the front optical system is followed by a zoom system comprising a fixed lens 4 of positive power and two moving lenses 5 and 6 of negative and positive power respectively. Movement of these lenses to vary the magnification is arranged by mechanical means (not shown) such that the real images of an object are formed at a fixed and convenient distance behind the fixed lens 4 during variation of the magnification.

The mechanical means employed to adjust the relative positions of the lenses according to the required law of movement for varying the magnification may take any convenient form but is preferably arranged such that equal movements of the magnification varying control alter the magnification by equal ratios. The limits between which the magnification can be varied are in the ratio of 5:1 in this example.

The fixed positive lens 4 and the moving negative and positive lenses 5 and 6 respectively of the zoom system are preferably made individually and substantially achromatic.

The two images are then viewed by means of eyepieces represented schematically at 10, after deviation of the axes by 60° towards the observer by means of a single inclining prism 7 common to both zoom systems, and after image erection by means of a prism 8, commonly known as a "Porro prism of the first kind," mounted normal to each axis 9 and arranged to rotate, in association with the corresponding eyepiece, about the entering zoom axis so as to provide a variable eyepiece separation without relative rotation or displacement of the images.

When the magnification-varying means is operated, causing the lenses to take up different relative positions along the zoom axes, the aberrations of the system as a whole will normally change by amounts which are much larger than those that can be tolerated in a microscope. In the present example, the spherical aberration and central coma of the fixed positive lens 4, of the moving negative lens 5 and of the moving positive lens 6 have been so chosen as to render both this variation and the total individual aberrations small and within limits acceptable even in a microscope of high quality. To achieve this result, the spherical aberration and central coma of the fixed positive lens 4 are preferably positive and positive in sign respectively; those of the moving negative lens 5 and preferably negative and positive in sign respectively while those of the moving positive lens 6 are preferably positive and negative in sign respectively.

The lens specificaion for the microscope of this example and the law of movement of the movable components are given in the following tables. All linear dimensions are quoted in millimetres.

TABLE A
[Dimensions and angles shown in Figure 3]

| A=7° | d1=6.75 mm. |
|---|---|
| B=24°43′ | d2=3.00 mm. |
| C=8°18′ | d3=6.07 mm. |
| | d4=11.51 mm. |
| | d5=3.00 mm. |
| | d6=1.5 mm. |
| | d7=12.17 mm. |

TABLE B

[Dimensions shown in Figures 1 and 3]

| | Surface | Radius | Centre Thickness | Chance-Pilkington Glass Type | Working Diameter |
|---|---|---|---|---|---|
| | | | So=93.13 | (Distance from Object) | |
| | r1 | Plane | | | 43.50 |
| | | | 4.00 | 518641 | |
| | r2 | −86.50 | | | |
| | | | 0.50 | Air | |
| Large Fixed Positive Lens | r3 | +988.0 | | | |
| | | | 4.50 | 700303 | |
| | r4 | +74.59 | | | 43.50 |
| | | | 7.50 | 518641 | |
| | r5 | −86.60 | | | |
| | | | | Air | |
| | r6 | Plane | | | |
| | | | | 700303 | |
| Fixed Deviating Prism | r7 | Plane | See Table A | | 17.00 |
| | | | | 518641 | |
| | r8 | Plane | | | |
| | | | | Air | |
| | r9 | +58.64 | | | |
| | | | 2.50 | 623603 | |
| Fixed Positive Lens | r10 | −40.96 | | | 15.60 |
| | | | 2.00 | 626357 | |
| | r11 | Plane | | | |
| | | | S1 | Air | |
| | r12 | −24.26 | | | |
| | | | 0.75 | 518641 | |
| Moving Negative Lens | r13 | +10.40 | | | 6.20 |
| | | | 1.25 | 700303 | |
| | r14 | +19.51 | | | |
| | | | S2 | Air | |
| | r15 | +68.56 | | | |
| | | | 2.50 | 700303 | |
| Moving Positive Lens | r16 | +27.97 | | | 17.70 |
| | | | 4.00 | 539604 | |
| | r17 | −43.52 | | | |
| | | | S3 | Air (Distance to Image) | |

TABLE C.—LAW OF MOVEMENT OF MOVABLE COMPONENTS

| S1 | S2 | S3 | Relative Magnification |
|---|---|---|---|
| 6.95 | 51.92 | 221.89 | 1.00 |
| 7.48 | 51.90 | 221.38 | 1.01 |
| 8.54 | 51.85 | 220.38 | 1.02 |
| 9.59 | 51.79 | 219.38 | 1.03 |
| 10.66 | 51.73 | 218.38 | 1.05 |
| 11.74 | 51.65 | 217.38 | 1.06 |
| 12.83 | 51.56 | 216.38 | 1.08 |
| 15.05 | 51.34 | 214.38 | 1.11 |
| 17.33 | 51.06 | 212.38 | 1.15 |
| 19.71 | 50.68 | 210.38 | 1.20 |
| 22.21 | 50.18 | 208.38 | 1.26 |
| 24.89 | 49.50 | 206.38 | 1.33 |
| 26.34 | 49.05 | 205.38 | 1.37 |
| 29.59 | 47.80 | 203.38 | 1.48 |
| 34.10 | 45.29 | 201.38 | 1.69 |
| 36.18 | 43.71 | 200.88 | 1.82 |
| 37.89 | 42.14 | 200.74 | 1.94 |
| 39.49 | 40.40 | 200.88 | 2.07 |
| 41.19 | 38.20 | 201.38 | 2.24 |
| 44.13 | 33.26 | 203.38 | 2.63 |
| 45.80 | 29.59 | 205.38 | 2.93 |
| 46.45 | 27.94 | 206.38 | 3.07 |
| 47.53 | 24.86 | 208.38 | 3.33 |
| 48.42 | 21.96 | 210.38 | 3.58 |
| 49.18 | 19.21 | 212.38 | 3.83 |
| 49.83 | 16.55 | 214.38 | 4.07 |
| 50.41 | 13.97 | 216.38 | 4.32 |
| 50.93 | 11.46 | 218.38 | 4.57 |
| 51.40 | 8.99 | 220.38 | 4.81 |
| 51.73 | 7.15 | 221.89 | 5.00 |

TABLE D.—OPTICAL PROPERTIES OF GLASSES

| Chance-Pilkington Glass Type | Refractive Index, $n_D$ | Dispersion Value, V |
|---|---|---|
| 518641 | 1.518 | 64.1 |
| 700303 | 1.700 | 30.3 |
| 623603 | 1.623 | 60.3 |
| 626357 | 1.626 | 35.7 |
| 519604 | 1.519 | 60.4 |

The microscope of this example is advantageous in that the object plane at the principal focus of the large front lens is perpendicular to the optical axis of this lens and results in the two images to be viewed by means of the eyepieces being perpendicular to the respective zoom axis along which each image is formed. Further, the residual secondary spectrum effects of this large front lens and of the achromatic deviating prisms are of opposite sign and their sum can be made substantially zero so as to eliminate undesirable lateral chromatic aberration along the two zoom axes. Another advantage of this microscope is that the achromatic deviating prisms introduce the desirable divergence between the zoom axes in a convenient manner.

Another advantage of this microscope is that the algebraic sum of the powers of the lenses may be made zero or small and this permits the design of a system with a flat image field. It is also advantageous in that it provides an eyepiece separation which is variable to suit the interpupillary distance of an observer without relative rotation or displacement of the images.

The invention is not restricted to the details of the foregoing example.

The front optical system may have attached to it on the object side an auxiliary lens system which may decrease the magnifications without substantially modifying the balance of lateral chromatic aberration. The entire front optical system can be replaced by a similar corrected optical system of different focal length so that the magnifications and/or the working distance may be change.

We claim:

1. A binocular stereoscopic microscope for providing two images of an object for the two eyes respectively of an observer, which microscope comprises a common front lens for receiving light from the object positioned on one side thereof and on the optical axis thereof, which front lens consists of a plurality of lens elements respectively having different refractive indices and dispersions so as to be substantially achromatic but has a small residual lateral chromatic aberration and in particular a secondary spectrum residual at least at parts thereof spaced away from its optical axis; a first optical system and a second optical system both positioned side-by-side on the other side of the common front lens and with their respective optical axes inclined to each other and also inclined to and spaced away from the optical axis of the front lens; and first and second deviating means located on the said other side of the front lens and on opposite sides of the optical axis of the front lens and spaced away therefrom, and respectively between the front lens and the first optical system, and the front lens and the second optical system; each of said deviating means comprising a substantially achromatic refracting wedge prism tapering toward the other and having more than one element, the elements having different refractive indices and dispersions so that the prism has a small secondary spectrum residual lateral chromatic aberration substantially equal and opposite to the residual lateral chromatic aberration of the front lens at the part thereof spaced away from the optical axis thereof which transmits light to the said deviating means.

2. A binocular stereoscopic microscope for providing two images of an object for the two eyes respectively of an observer, which microscope comprises a common front lens for receiving light from the object positioned on one side thereof and on the optical axis thereof, which front lens is substantially achromatic but has a small residual lateral chromatic aberration and in particular a secondary spectrum residual at least at parts thereof spaced away from its optical axis; a first optical system and a second optical system both positioned side-by-side on the other side of the common front lens and with their respective optical axes inclined to each other and also inclined to and spaced away from the optical axis of the front lens; and first and second deviating means located on the said other side of the front lens and on opposite sides of the optical axis of the front lens and spaced away therefrom, and respectively between the front lens and the first optical system, and the front lens and the second optical system; each of said deviating means comprising a substantially acromatic refracting wedge prism which has a small secondary spectrum residual lateral chromatic aberration substantially equal and opposite to the residual lateral chromatic aberration of the front lens at the part thereof spaced away from the optical axis thereof which transmits light to the said deviating means; said refracting wedge prisms tapering toward each other; each of which first and second optical systems is of continuously variable magnifying power and includes a first lens fixed in position and of positive power, a second lens movable in position and of negative power, and a third lens movable in position and of positive power; the spherical aberration and central coma of the said first lens being both positive in sign, of the said second lens being negative and positive in sign respectively, and of the said third lens being positive and negative in sign.

3. A binocular stereoscopic miscroscope comprising two optical systems each of variable magnification and having their optical axes inclined to each other at an included angle of 14°; a front optical system preceding the variable magnification systems and including both a front lens systems and deviating prisms, and a prism system following the variable magnification systems to incline the plane of the two eyepieces towards the observer, to invert the images and to provide means of adjusting the eyepiece separation to suit the interpupillary distance of the observer, the large front lens of the front optical system comprising a plano-convex element followed by a cemented doublet, the equivalent focal length of this lens system being 100 mm., which permits a clear working distance of 93 mm., an angle between the viewing axes of 14° with a separation of 24.34 mm., between the parallel viewing axes on the image side of the front lens system; the chromatic aberration, spherical aberration and coma of the front lens system being made small and non-zero at the full aperture of the lens in such a way as to reduce to a minimum the total aberration integrated over that aperture of the lens system used by each of the following zoom lens systems, each of which is effectively centered on one of the two viewing axes; the microscope further comprising, following the front lens system, on each viewing axis, an achromatic deviating prism constructed from the same types of optical glass employed in the large front lens and each providing a deviation equal to 7° in the minimum deviation position and each in a direction opposed to the deviation of the corresponding viewing axis which takes place at the large front lens, following the compound front lens plus prism system, the viewing axes, diverging at an angle of 14°; on each zoom axis, the front optical system being followed by a zoom system comprising a fixed lens of positive power and two moving lenses of negative and positive power respectively, the fixed positive lens and the moving negative and positive lenses respectively of the zoom system being made individually and substantially achromatic; the two images being viewed by means of eyepieces after deviation of the axes by 60° towards the observer by means of a single inclining prism common to both zoom systems, and after image erection by means of a Porro prism, mounted normal to each axis and arranged to rotate, in association with the corresponding eyepiece, about the entering zoom axis so as to provide a variable eyepiece separation without relative rotation or displacement of the images; the spherical aberration and central coma of the fixed positive lens of the moving negative lens and of the moving positive lens being so chosen as to render both the variation of the aberrations of the system as a whole and the total individual aberrations small and within limits acceptable even in a microscope of high quality, to which end the spherical aberration and central coma of the fixed positive lens are positive and positive in sign respectively; those of the moving negative lens are negative and positive in sign respectively while those of the moving positive lens are positive and negative in sign respectively; the lens specification for the microscope and the law of movement of the movable components being as follows (all linear dimensions being in millimeters), in Table A, the symbol A designates the angle between each viewing axis and the axis of the front lens system and the symbols B and C the apex angles of the components of the deviating prisms. The symbol $d1$ designates the spacing between each deviating prism and the fixed lens of each zoom system, $d2$ and $d3$ designate the inner thickness of the components of the deviating prisms and $d4$ and $d5$ the corresponding outer thickness. The symbol $d6$ designates the separation between each viewing axis and the axis of the front lens system, measured at the front lens system, the microscope further providing that the object plane at the principal focus of the large front lens is perpendicular to the optical TABLE A
[Dimensions and angles shown in Figure 3]

| | |
|---|---|
| A=7° | $d1$=6.75 mm. |
| B=24°43′ | $d2$=3.00 mm. |
| C=8°18′ | $d3$=6.07 mm. |
| | $d4$=11.51 mm. |
| | $d5$=3.00 mm. |
| | $d6$=1.5 mm. |
| | $d7$=12.17 mm. |

TABLE B
[Dimensions shown in Figures 1 and 3]

| | Surface | Radius | Centre Thickness | Chance-Pilkington Glass Type | Working Diameter |
|---|---|---|---|---|---|
| | r1 | Plane | So=93.13 | (Distance from Object) | 43.50 |
| | | | 4.00 | 518641 | |
| | r2 | −86.50 | | | |
| | | | 0.50 | Air | |
| Large Fixed Positive Lens | r3 | +988.0 | | | |
| | | | 4.50 | 700303 | |
| | r4 | +74.59 | | | 43.50 |
| | | | 7.50 | 518641 | |
| | r5 | −86.60 | | | |
| | | | | Air | |
| | r6 | Plane | | | |
| | | | | 700303 | |
| Fixed Deviating Prism | r7 | Plane | See Table A | | 17.00 |
| | | | | 518641 | |
| | r8 | Plane | | | |
| | | | | Air | |
| | r9 | +58.64 | | | |
| | | | 2.50 | 623603 | |
| Fixed Positive Lens | r10 | −40.96 | | | 15.60 |
| | | | 2.00 | 626357 | |
| | r11 | Plane | | | |
| | | | S1 | Air | |
| | r12 | −24.26 | | | |
| | | | 0.75 | 518641 | |
| Moving Negative Lens | r13 | +10.40 | | | 6.20 |
| | | | 1.25 | 700303 | |
| | r14 | +19.51 | | | |
| | | | S2 | Air | |
| | r15 | +68.56 | | | |
| | | | 2.50 | 700303 | |
| Moving Positive Lens | r16 | +27.97 | | | 17.70 |
| | | | 4.00 | 539604 | |
| | r17 | −43.52 | | | |
| | | | S3 | Air (Distance to Image) | |

TABLE C.—LAW OF MOVEMENT OF MOVABLE COMPONENTS

| S1 | S2 | S3 | Relative Magnification |
|---|---|---|---|
| 6.95 | 51.92 | 221.89 | 1.00 |
| 7.48 | 51.90 | 221.38 | 1.01 |
| 8.54 | 51.85 | 220.38 | 1.02 |
| 9.59 | 51.79 | 219.38 | 1.03 |
| 10.66 | 51.73 | 218.38 | 1.05 |
| 11.74 | 51.65 | 217.38 | 1.06 |
| 12.83 | 51.56 | 216.38 | 1.08 |
| 15.05 | 51.34 | 214.38 | 1.11 |
| 17.33 | 51.06 | 212.38 | 1.15 |
| 19.71 | 50.68 | 210.38 | 1.20 |
| 22.21 | 50.18 | 208.38 | 1.26 |
| 24.89 | 49.50 | 206.38 | 1.33 |
| 26.34 | 49.05 | 205.38 | 1.37 |
| 29.59 | 47.80 | 203.38 | 1.48 |
| 34.10 | 45.29 | 201.38 | 1.69 |
| 36.18 | 43.71 | 200.88 | 1.82 |
| 37.89 | 42.14 | 200.74 | 1.94 |
| 39.49 | 40.40 | 200.88 | 2.07 |
| 41.19 | 38.20 | 201.38 | 2.24 |
| 44.13 | 33.26 | 203.38 | 2.63 |
| 45.80 | 29.59 | 205.38 | 2.93 |
| 46.45 | 27.94 | 206.38 | 3.07 |
| 47.53 | 24.86 | 208.38 | 3.33 |
| 48.42 | 21.96 | 210.38 | 3.58 |
| 49.18 | 19.21 | 212.38 | 3.83 |
| 49.83 | 16.55 | 214.38 | 4.07 |
| 50.41 | 13.97 | 216.38 | 4.32 |
| 50.93 | 11.46 | 218.38 | 4.57 |
| 51.40 | 8.99 | 220.38 | 4.81 |
| 51.73 | 7.15 | 221.89 | 5.00 |

TABLE D.—OPTICAL PROPERTIES OF GLASSES

| Chance-Pilkington Glass Type | Refractive Index, $n_D$ | Dispersion Value, V |
|---|---|---|
| 518641 | 1.518 | 64.1 |
| 700303 | 1.700 | 30.3 |
| 623603 | 1.623 | 60.3 |
| 626357 | 1.626 | 35.7 |
| 519604 | 1.519 | 60.4 | axis of this lens which results in the two images to be viewed by means of the eyepieces being perpendicular to the respective zoom axis along which each image is formed; and that the residual secondary spectrum effects of this large front lens and of the achromatic deviating prisms are of opposite sign and their sum is made substantially zero so as to eliminate undesirable lateral chromatic aberration along the two zoom axes; and that the algebraic sum of the powers of the lenses is zero or small which permits the design of a system with a flat image field; and that the eyepiece separation is variable to suit the interpupillary distance of an observer without relative rotation or displacement of the images.

References Cited

UNITED STATES PATENTS

| | | | |
|---|---|---|---|
| 1,962,834 | 6/1934 | Patterson | 350—36 |
| 2,765,702 | 10/1956 | Sachtleben | 351—1 |
| 2,942,519 | 6/1960 | Boughton et al. | 350—36 |
| 3,045,542 | 7/1962 | Finkelstein | 350—181 X |
| 3,057,259 | 10/1962 | Schuma | 350—35 |

FOREIGN PATENTS

| | | |
|---|---|---|
| 713,243 | 8/1954 | Great Britain. |
| 1,116,911 | 11/1961 | Germany. |

DAVID H. RUBIN, *Primary Examiner.*